3,558,680
FERROCENE DERIVATIVE

Lawrence R. Moffett, Jr., Huntsville, and Julius D. Capps, Opelika, Ala., assignors to Thiokol Chemical Corporation, Bristol, Pa., a corporation of Delaware
No Drawing. Filed Sept. 27, 1962, Ser. No. 227,653
Int. Cl. C07f 15/02
U.S. Cl. 260—439      1 Claim This invention relates to a new compound, (2-(2-n-butoxyethoxy) ethyl (cyclopentadienyl)iron cyclopentadienylcarboxylate.

In U.S. Pat. 2,680,756, there was described a new organic iron compound, dicyclopentadienyliron. This compound is most widely known by its common name: ferrocene. The use of ferrocene in the past has demonstrated its utility as a rate catalyst in combustion processes.

In U.S. Pat. 2,683,157, there was described a derivative of dicyclopentadienyliron, the new compound carboxycyclopentadienyl(cyclopentadienyl)iron. This compound is widely known by its common name: ferrocene carboxylic acid. Organic compounds incorporating the ferrocene (dicyclopentadienyliron) nucleus may be synthesized from this compound.

It is an object of the present invention to provide a new organo-iron compound, incorporating the ferrocene nucleus, which has utility as a rate catalyst in combustion processes.

2 - (2 - n-butoxyethoxy)ethyl(cyclopentadienyl)ironcyclopentadienylcarboxylate is a stable, orange-brown, oily liquid. It has the formula

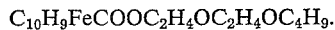

$C_{10}H_9FeCOOC_2H_4OC_2H_4OC_4H_9$.

It is insoluble in water, but soluble in ordinary organic solvents such as benzene, ether, aliphatic hydrocarbons and the like. The compound may also be called n-butylcarbitol ferrocenecarboxylate, from the common names of the compounds from which it is formed.

The compound is prepared by esterification of ferrocene carboxylic acid with 2-(2-n-butoxyethoxy)ethanol (common name: n-butylcarbitol). Since the direct esterification is a difficult reaction, the preparation is most readily carried out through the well-known means of an acid chloride intermediate.

The methods of preparing the compound of this invention are illustrated by the following examples. For purposes of brevity, common names will be used.

EXAMPLE 1

A solution of ferrocene carboxylic acid chloride is prepared by dissolving 230 grams of dried ferrocene carboxylic acid in theree (3) liters of dry benzene. While this solution is continuously stirred, phosphorous trichloride (50.3 grams) is added during a half-hour period. The resulting acid chloride solution is refluxed for 72 hours.

n-Butyl carbitol (194.4 grams) is added to the thus prepared acid chloride solution, and the resulting solution is refluxed for 48 hours.

The benzene solvent is evaporated under vacuum, and the crude n-butylcarbitol ferrocenecarboxylate is dissolved in two (2) liters of ethyl ether. Unreacted ferrocene carboxylic acid is removed from the resulting ether solution by extraction with 10% aqueous sodium hydroxide. The ether solution is then washed with water to neutrality, and dried over a suitable drying agent (magnesium sulfate, calcium chloride, etc.).

The ether is removed by vacuum evaporation, leaving approximately 260 grams of the orange-brown, liquid n-butylcarbitol ferrocene carboxylate. This is equal to a yield of 70%, based on the ferrocene carboxylic acid charged.

EXAMPLE 2

Dried ferrocene carboxylic acid (360 grams) is dissolved in six (6) liters of dry benzene. The solution is stirred while being refluxed, and phosphorous trichloride (78.3 grams) is added dropwise during a thirty-minute period. The resulting acid chloride solution is refluxed with continuous stirring for 24 hours.

n-Butyl carbitol (300 grams) is then added to the acid chloride solution, and refluxing is continued for three days. Additional n-butyl carbitol (130 grams) is added to the solution, and refluxing is continued for 24 hours.

The resulting solution is concentrated to a volume of one liter by vacuum evaporation. Water is added to the concentrated solution, and the precipitated, unreacted ferrocene carboxylic acid is removed by filtration.

The crude n-butylcarbitol ferrocenecarboxylate is extracted from the filtered benzene-water solution with ethyl ether. The resulting ether solution is washed, first with 10% aqueous sodium hydroxide and then with water to neutrality, and dried over anhydrous magnesium sulfate.

The ether is removed from the thus dried solution by vacuum evaporation, leaving 406 grams of the liquid n-butylcarbitol ferrocene carboxylate, 69% of theoretical yield.

EXAMPLE 3

The ester may also be prepared by reaction of n-butylcarbitol chlorosulfite with sodium ferrocenecarboxylate. The sodium salt of ferrocene carboxylic acid is readily prepared by neutralization of the acid in benzene solution with dilute sodium hydroxide. n-Butylcarbitol chlorosulfite is prepared by reaction of n-butyl carbitol with thionyl chloride according to standard procedures.

n-Butylcarbitol chlorosulfite (19.6 grams) is added to dried sodium ferrocenecarboxylate (10.08 grams). The mixture is heated to 110° C., and maintained at this temperature until the evolution of sulfur dioxide has ceased (about 1½ hours). The dark mass resulting from this reaction is tritrated with water, decanted, washed once with 10% aqueous sodium hydroxide, and then washed with water to neutrality.

The crude n-butylcarbitol ferrocenecarboxylate is extracted from the washed reaction mass with ethyl ether. The ether extract is dried over magnesium sulfate and filtered. The ether is removed from the partially purified ester by vacuum evaporation, and the solids which separate during standing overnight at room temperature are removed by filtration. The filtrate is washed, first with 10% aqueous sodium hydroxide and then with water to neutrality, and dried over magnesium sulfate. Further concentration of the washed and dried filtrate by vacuum evaporation leaves 8 grams of the oily n-butylcarbitol ferrocene carboxylate.

What is claimed is:
1. 2 - (2-n-butoxyethoxy)ethyl(cyclopentadienyl)iron-cyclopentadienylcarboxylate.

References Cited
UNITED STATES PATENTS 3,217,019  11/1965  Young _____ 260—439X
3,294,685  12/1966  Stevens et al. _____ 260—439X LELAND A. SEBASTIAN, Primary Examiner U.S. Cl. X.R.
149—109